(12) United States Patent
Stadtfeld (10) Patent No.: US 8,967,926 B2
(45) Date of Patent: Mar. 3, 2015

(54) MANUFACTURING BEVEL GEARS

(75) Inventor: Hermann J. Stadtfeld, Webster, NY (US)

(73) Assignee: The Gleason Works, Rochester, NY (US)

( * ) Notice: Subject to any disclaimer, the term of this patent is extended or adjusted under 35 U.S.C. 154(b) by 1008 days.

(21) Appl. No.: 12/996,698

(22) PCT Filed: Jun. 23, 2009

(86) PCT No.: PCT/US2009/003720
§ 371 (c)(1),
(2), (4) Date: Dec. 7, 2010

(87) PCT Pub. No.: WO2009/157988
PCT Pub. Date: Dec. 30, 2009

(65) Prior Publication Data
US 2011/0103911 A1    May 5, 2011

Related U.S. Application Data

(60) Provisional application No. 61/132,804, filed on Jun. 23, 2008.

(51) Int. Cl.
*B23F 9/08* (2006.01)
*B23F 1/06* (2006.01)

(52) U.S. Cl.
CPC .... *B23F 9/08* (2013.01); *B23F 1/06* (2013.01)
USPC .................................. 409/51; 409/38; 409/52

(58) Field of Classification Search
CPC ................ B23F 1/00; B23F 1/06; B23F 9/02; B23F 9/10; B23F 9/12; B23F 9/14; B23F 9/105; B23F 9/08
USPC .............................. 409/25, 26, 38, 50, 51, 52
See application file for complete search history.

(56) References Cited

U.S. PATENT DOCUMENTS

| 1,486,771 | A | * | 3/1924 | Ljungstrom | 409/51 |
|---|---|---|---|---|---|
| 2,429,324 | A | * | 10/1947 | Meisser | 416/188 |
| 2,737,855 | A | * | 3/1956 | Wenz | 409/52 |
| 2,758,513 | A | * | 8/1956 | Deakin | 409/38 |
| 4,090,428 | A | | 5/1978 | Kotthaus et al. | |
| 4,543,020 | A | * | 9/1985 | Shtipelman | 409/12 |
| 4,949,456 | A | * | 8/1990 | Kovach et al. | 29/893.35 |
| 4,981,402 | A | | 1/1991 | Krenzer et al. | |
| 6,669,415 | B2 | | 12/2003 | Stadtfeld et al. | |
| 6,712,566 | B2 | | 3/2004 | Stadtfeld et al. | |
| 2007/0283545 | A1 | * | 12/2007 | Langerfeld | 29/56.5 |

FOREIGN PATENT DOCUMENTS

GB        793831 A     4/1958

* cited by examiner

*Primary Examiner* — Daniel Howell
*Assistant Examiner* — Michael Vitale
(74) *Attorney, Agent, or Firm* — Robert L. McDowell (57) ABSTRACT

A method of manufacturing bevel gears with a tool, such as a tapered milling tool (16), wherein the tool is located at a position offset ($R_w$) from the center position of a conventional face milling cutter and the tool follows a path, such as a circular arc path, during machining.

14 Claims, 8 Drawing Sheets

MANUFACTURING BEVEL GEARS

FIELD OF THE INVENTION

The present invention is directed to a method of manufacturing bevel gears and in particular to a method of manufacturing bevel gears with a tapered tool.

BACKGROUND OF THE INVENTION

Manufacturing of spiral bevel and hypoid gears can be conducted in several ways. The following methods are among those commonly known:
1. Face hobbing with a circular face cutter, which rotates while the work also rotates (continuous indexing).
2. Face hobbing with tapered hob (peripheral cutter), which rotates while the work also rotates (continuous indexing).
3. Shaping method with one or two tools which move linearly while the work rotates (continuous or single indexing).
4. Face milling, with circular face cutter, which rotates while the work is not rotating (non-generating) or which rotates while work only performs a roll (generating), but no continuous indexing motion (single indexing).
5. Universal 5-axis milling with pencil shaped end mill (single slot manufacturing).

In face milling (intermittent or single indexing) processes, tooth slots are formed individually in succession by feeding a rotating tool into a workpiece to a predetermined depth, withdrawing the tool, and indexing the workpiece to another (usually the next) tooth slot position. The steps of feeding, withdrawing and indexing are repeated until all tooth slots are formed. This type of face milling process is known as a non-generating process. The profile shape of a tooth on a workpiece is produced directly from the profile shape on the tool.

Alternative to non-generated face milling, a face milling generating process may be performed wherein once the tool is fed to a predetermined depth, the tool and workpiece are then rolled together in a predetermined relative rolling motion, known as the generating roll, as though the workpiece were rotating in mesh with a theoretical generating gear, the teeth of the theoretical generating gear being represented by the stock removing surfaces of the tool. The profile shape of the tooth is formed by relative motion of the tool and workpiece during the generating roll. The steps of feeding, rolling, withdrawing and indexing are repeated for each tooth slot until all tooth slots are formed.

In face hobbing (continuous indexing) processes (non-generated or generated), the tool and workpiece rotate in a timed relationship and the tool is fed to depth thereby forming all tooth slots in a single plunge of the tool. After full depth is reached, a generating roll may be performed.

The above methods 1-4 are well known and have been performed for more than 50 years. Method 5 became possible with the ability to enter complex free form surfaces into the computer control of 5-axis universal milling machines. While the manufacturing time is usually between about 100 and 1000 times that of the above processes 1-4 and the accuracy is in general less than that of the dedicated machines used to perform methods 1-4, the advantage of 5-axis bevel gear machining on a universal milling machine is the flexibility. No special cutting tool is required and the bevel gear size is only limited by the size of the 5-axis milling machines available.

On the universal milling machines, a spherical or cylindrical shaped mill is used in order to shape the tooth flank surfaces. The data post processing uses flank surface points and in some cases normal vectors to calculate the machining paths. The machining paths have to be sufficiently accurate so as to achieve enveloping paths which approximate the target surface with reasonable precision. The orientation of enveloping paths (flats) is only linked to the machining strategy, in order to minimize the machining time and the deviation from the target flank surface.

BRIEF DESCRIPTION OF THE INVENTION

The present invention is directed to a method of manufacturing bevel gears with a tapered tool wherein the tapered milling tool is located at a position offset from the center position of a conventional face milling cutter and the tapered milling cutter follows a circular arc path during machining.

DETAILED DESCRIPTION OF THE PREFERRED EMBODIMENTS

The present invention will now be discussed with reference to preferred embodiments and the drawings which represent the invention by way of example only. In the context of the present invention, the term "bevel" gears is understood to be of sufficient scope to include those types of gears known as bevel gears, "hypoid" gears, as well as those gears known as "crown" or "face" gears.

The inventive method defines tooth flank surfaces dependent on basic machine settings of a theoretical gear generating machine which define the relative location between a face cutter head, a generating gear axis and a work axis, as well as a kinematic relationship between those three components.

The relationship between the workpiece and generating gear can be defined by a group of parameters known as basic machine settings. These basic settings communicate a sense of size and proportion regarding the generating gear and the workpiece and provide a common starting point for gear design thus unifying design procedures among many models of machines. The basic settings totally describe the relative positioning between tool and workpiece at any instant.

Basic machine settings for forming gears are known in the art and may be identified as follows:

1. radial, S,—distance between the cradle axis and the tool axis;
2. tilt angle, $P_i$,—angle between the cradle axis and the tool axis;
3. swivel angle, $P_j$,—orientation of the tool axis relative to a fixed reference on the cradle;
4. cradle angle, q,—angular position of the tool about the cradle axis;
5. root angle, $\Sigma$,—sets forth the orientation of the work support relative to the cradle axis;
6. sliding base, $X_b$,—distance from the machine center to the apparent intersection of the work and cradle axes;
7. head setting, $X_p$,—distance along the work axis from the apparent intersection of the work and cradle axes to a point located a fixed distance from the workpiece;
8. work offset, $E_m$, distance between the work axis and the cradle axis;
9. ratio-of-roll, $R_a$,—ratio of the rotation of the workpiece to the rotation of the cradle (used in generating processes);
10. rotational position of the workpiece, $W_g$, and rotational position of the tool, $W_t$, (used for face hobbing).

A conventional spread blade face milling cutter envelopes an outside cone and an inside cone which together form a circular channel. It can be understood that a gear tooth slot generally represents a predetermined length of a circular channel. Cup shaped grinding wheels are dimensioned to duplicate the cutting channel for one particular gear design (stock allowance taken into account).

Figure 1:
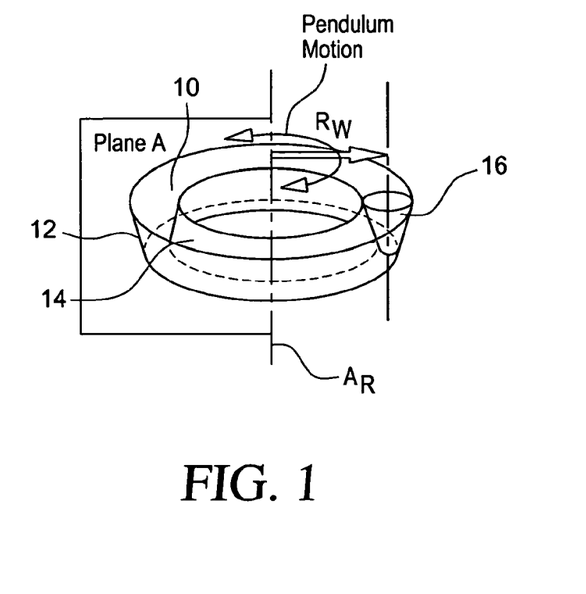
FIG. 1 illustrates a cutting or grinding channel formed by a conventional face mill cutter or grinding wheel.
Figure 2:
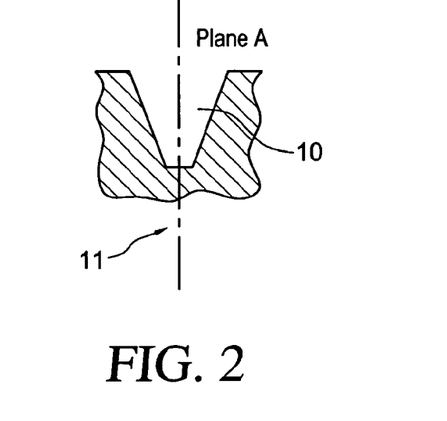
FIG. 2 is a cross-sectional view of the channel of FIG. 1.

A typical cutting or grinding channel 10 is shown in FIG. 1 and in cross-section in FIG. 2 where the reference profile center line 11 is shown. Particularly for large (e.g. outer diameter greater than 800 mm) spiral bevel gear sets, it is common to use pressure angles of 20° for each of concave and convex flanks. In such a case, the outside silhouette 12 and the inside silhouette 14 of the cutting channel are cones which have angles of +20° and −20° relative to the axis of rotation, $A_R$.

Figure 3:
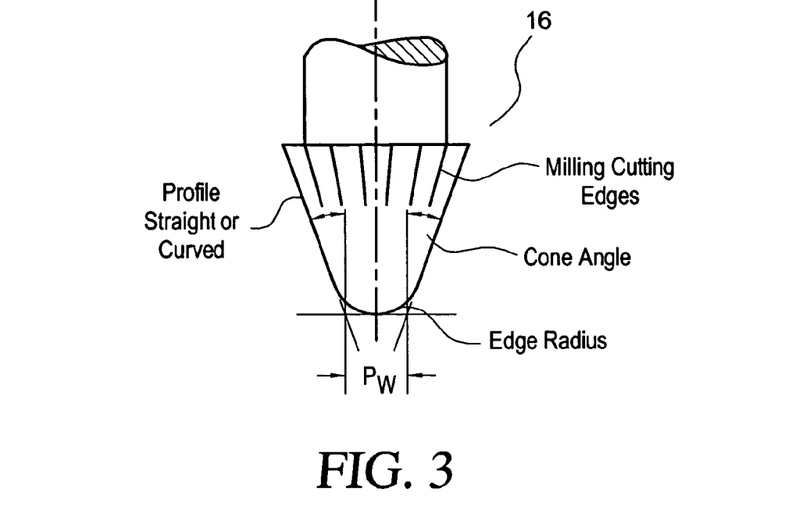
FIG. 3 illustrates a tapered milling tool.

A tapered milling tool 16 (FIG. 3) with a cone angle of 20° and a tip diameter, with the value of the point width, $P_W$, comparable to that of the face mill cutter head, will fit into the cutting channel 10. By providing the milling tool 16 with the appropriate edge radius and a straight or curved profile, the cross sectional view of the milling tool 16 will duplicate the cross section of the cutting channel 10. Additional features, such as a protuberance, may also be included on the tool.

Such a milling tool can be positioned in the tool spindle of a free form bevel gear cutting or grinding machine such as those disclosed by U.S. Pat. Nos. 4,981,402; 6,669,415 and 6,712,566, the disclosures of which are hereby incorporated by reference. The cutting or grinding machine axes can perform the cycle of movements including the kinematical relationship of the work and tool in the manner the same (or nearly the same) as that performed to generate a bevel gear in a conventional process utilizing a known face mill cutter or grinding wheel.

Figure 4:
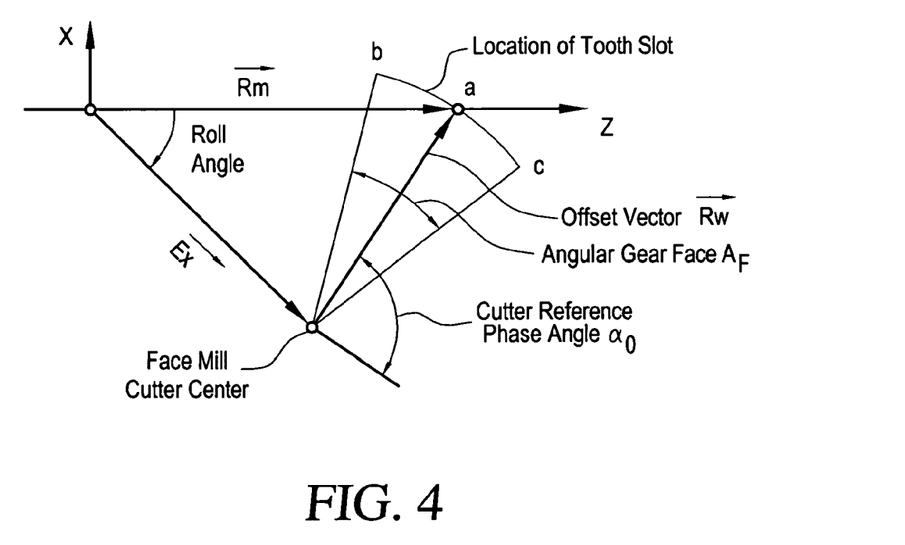
FIG. 4 shows a machine set-up diagram for a conventional face mill cutter and a tapered milling cutter of the present invention.

However, the tapered milling tool of the present invention is located in the same position as the center of a face milling cutter in the conventional method. To duplicate the flank surface forming (cutting and generating) action, two additions to the standard setup and cutting cycle are necessary to accommodate the tapered milling tool. First, the milling tool is required to be moved to an offset location ("a" in FIG. 4). The offset vector is identical to the average cutter point radius vector and can be located in the center of the tooth face width (point "a" in FIG. 4). Second, the milling tool has to follow a circular arc in the plane of the face milling cutter. FIG. 4 shows the case where the face milling cutter rotational plane is identical to the plane X-Z.

The conventional cutting machine setup positions the cutter center at the position of the tip of the vector $E_X$ (FIG. 4). In order to cut with a tapered milling cutter according to the present invention, the center of the cutter spindle is positioned along the path of the arc b-a-c in FIG. 4 and is movable between the positions b-a-c (and reverse) while the cutting machine is in one generating roll position. In the next roll position the movement along b-a-c has to repeat. It is also possible to use a continuous slow generating roll motion while the machine axes perform a fast pendulum motion of the tool center between b-a-c. Of course it is understood that for non-generating processes (i.e. no generating roll), only a single generating roll position is utilized when cutting a tooth slot.

The inventive method can utilize a standard free-form cutting machine with a standard cutting cycle. The part machining program includes an additional term as shown in the following formulas for milling cutter locations b, a and c:

| Milling Cutter Location | Conventional Face Cutter Center | | Additional Term | |
|---|---|---|---|---|
| b: | $\vec{E}_X$ | + | $R_W \times \begin{Bmatrix} \sin\left(-q_0 + \alpha_0 + \dfrac{A_F}{2}\right) \\ 0 \\ \cos\left(-q_0 + \alpha_0 + \dfrac{A_F}{2}\right) \end{Bmatrix}$ | (1) |
| a: | $\vec{E}_X$ | + | $R_W \times \begin{Bmatrix} \sin(-q_0 + \alpha_0) \\ 0 \\ \cos(-q_0 + \alpha_0) \end{Bmatrix}$ | (2) |
| c: | $\vec{E}_X$ | + | $R_W \times \begin{Bmatrix} \sin\left(-q_0 + \alpha_0 - \dfrac{A_F}{2}\right) \\ 0 \\ \cos\left(-q_0 + \alpha_0 - \dfrac{A_F}{2}\right) \end{Bmatrix}$ | (3) |

In order to generate the profile of a tooth, the theoretical generating gear has to rotate. This rotation is equal to a rotation of the vector $E_X$ in FIG. 4 about the Y axis (perpendicular to the drawing plane).

The inventive process can be performed on a free-form bevel gear cutting machine or a bevel gear cutting machine with modified travels. Modified travels would allow the manufacture of very large bevel gears on relatively small machines.

It is also possible to perform the inventive process on a 5-axis milling machine. However, the infrastructure and accuracy level of the free form bevel gear machine are a desirable platform for bevel gear cutting.

Figure 5:
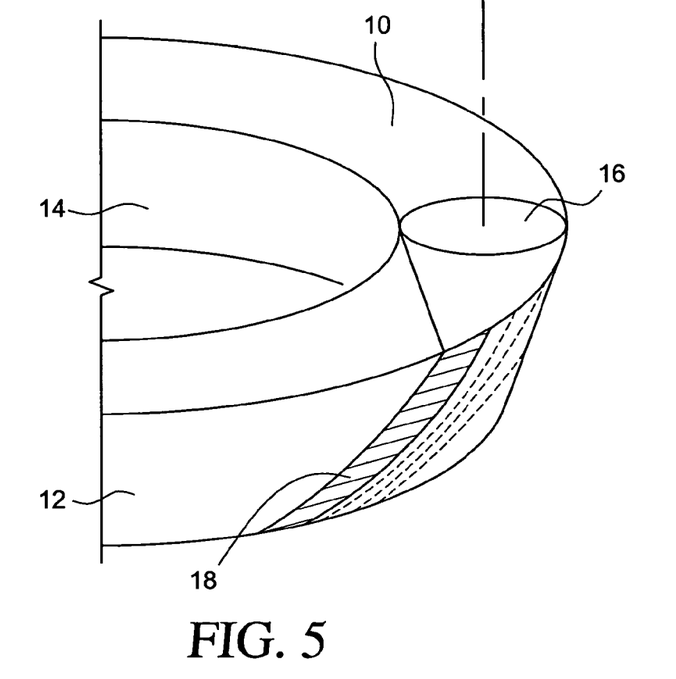
FIG. 5 shows a view of a tapered milling cutter as it simulates a face mill cutter in one instantaneous roll position.
Figure 6:
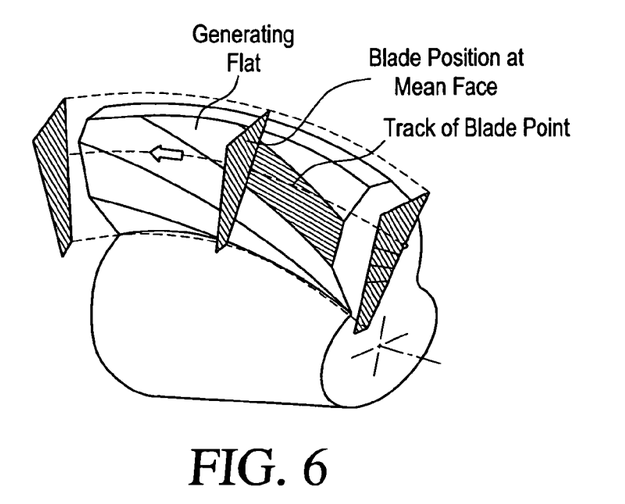
FIG. 6 illustrates the relationship between the generating flat sections of a tool and the generating flanks on a tooth flank surface.

One advantage of the inventive method is the fact that it produces bevel gear geometries identical to those produced with conventional face milling cutters. Even the generating flats have the same characteristics and angular orientation between the inventive method and the face milling cutter method. FIG. 5 shows a three dimensional representation of the conical milling tool 16 as it simulates the face cutter in one instantaneous roll position 18. Since the face cutter would produce in this roll position one generating flat per flank (indicated on the outside silhouette in FIG. 5), the tapered milling tool will produce the identical flat. As the rolling motion progresses, further flats will be produced. FIG. 6 shows how the generating flat sections of the tool silhouette relate to the real generating flats on a flank surface.

The generating flat orientation of the universal 5-axis machine (prior art method No. 5 above) are different than the flat orientation of the face milling cutter method. The universal 5-axis machine method will, in many cases, introduce different surface structures which lead to unfavorable roll conditions.

The second advantage of the inventive method is the fact that standard cycles can be applied (super-imposed on the pendulum motion), e.g. for soft cutting, which leads to manufacturing times of about 10 to 100 times that of the conventional processes 1 and 4, which is in most cases only about 10% of the manufacturing time of a 5-axis universal milling machine using an end mill according to known process 5. At the same time, the gear accuracy of the inventive method is comparable to conventional processes 1 and 4 due to the use of a gear machine tool concept versus a 5-axis universal CNC milling center.

A third advantage of the inventive method is the compatibility to the cutting and grinding with face cutters. All existing design and optimization computer programs can be used. Also, the nominal data calculations, correction matrixes, and established and well proven correction software (e.g. G-AGE™ gear correction software commercially available from The Gleason Works, Rochester, N.Y.) can be applied.

Even in cases of unequal inside and outside blade angles of the analogue face cutter process, a tapered milling cutter with half the included blade angles $(\alpha_{IB}+\alpha_{OB})/2$ as a cone angle can be used if the milling tool will be inclined by $\kappa_{mill-tool}=-(\alpha_{IB}+\alpha_{OB})/2$.

Figures 7, 8:
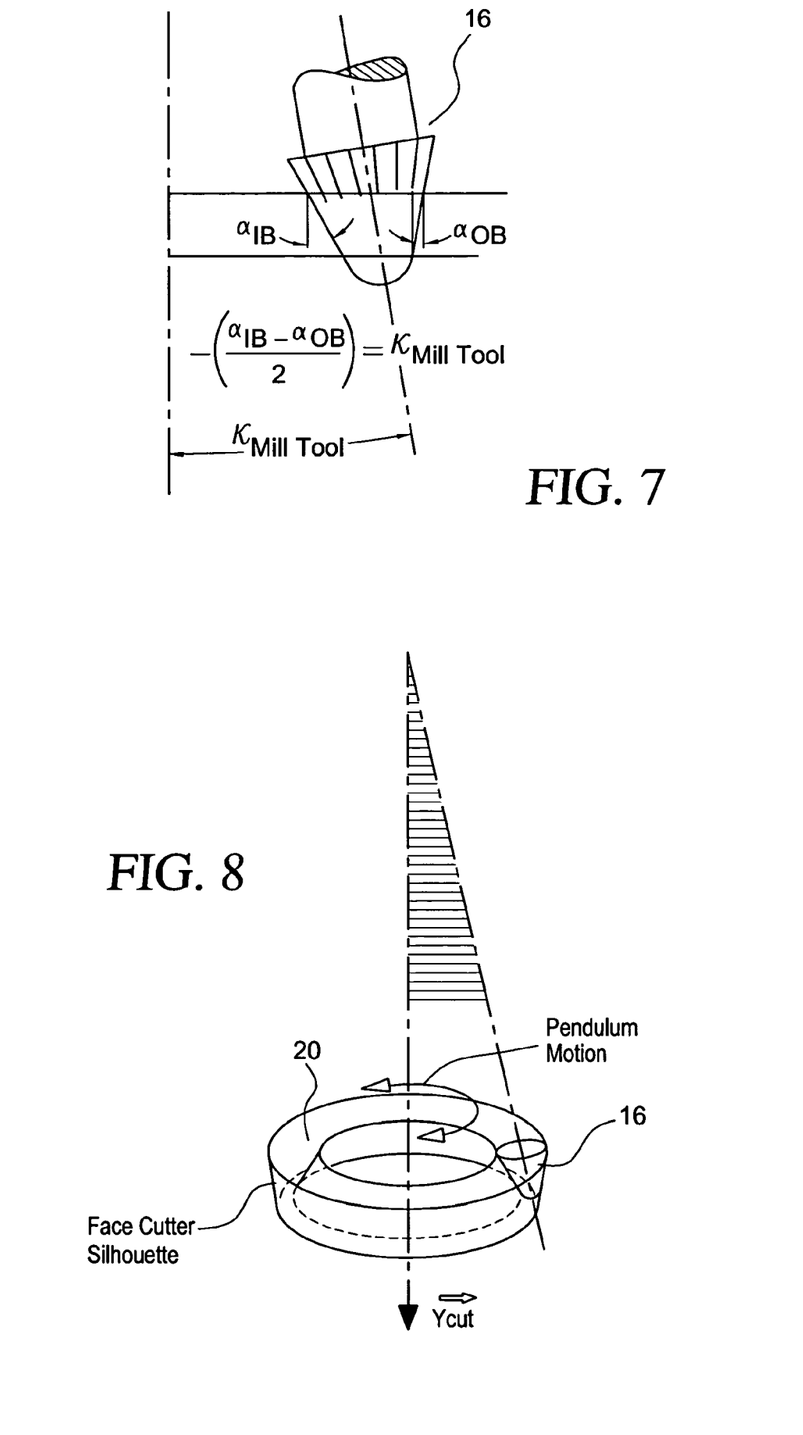
FIG. 7 shows an inclined milling tool representing unequal inside and outside blade angles of an analogous face mill cutter.
FIG. 8 shows an asymmetrical cutting channel produced by the inclined milling tool of FIG. 7.
Figure 9:
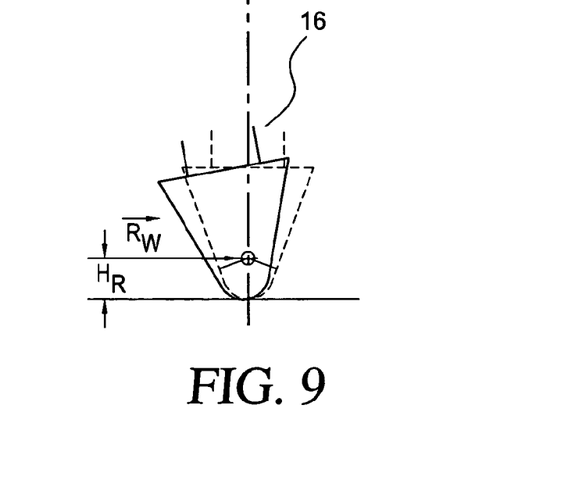
FIG. 9 represents a view of non-inclined and inclined positions of a tapered milling tool.

The calculation of the position of a tapered milling tool in the general case can be calculated, based on the geometric relationships shown in FIGS. 7, 8 and 9 as follows:

Input:
Cutter tilt=Wx
Cutter swivel=Wy
Mean cutter radius=Rw
Cutter phase angle reference value=$\alpha_o$
Cutter phase angle=$\alpha_x$
Roll position=q
Blade reference height=$H_R$
Mean cone distance=$R_m$
Sliding base position=$X_B$
Additional milling tool inclination=$\kappa_{Mill\_Tool}$
Radial Setting=S
Cutter Radius vector at reference position=$Rw(\alpha_o)$
Gear Face Angle=$A_F$ $$\vec{E}_{X\ mill} = \underbrace{\vec{E}_X - H_R \times \vec{Y}_{Cut}}_{Conventional\ Cutting} + H_R \times \vec{Y}_{Cut\ mill}(\alpha_i) + \vec{R}_W(\alpha_i) \quad (4)$$

where:

$$\vec{Y}_{Cut} = \begin{Bmatrix} T_{Kap}(2,1) \\ T_{Kap}(2,2) \\ T_{Kap}(2,3) \end{Bmatrix} \quad (5)$$

$$\vec{E}_X = \begin{Bmatrix} -\sin(q_i) \times S \\ X_B \\ \cos(q_i) \times S \end{Bmatrix} \quad (6)$$

$$(T_{Kap}) = \begin{pmatrix} \cos(w_Y) & 0 & \sin(w_Y) \\ 0 & 1 & 0 \\ -\sin(w_Y) & 0 & \cos(w_Y) \end{pmatrix} \times \begin{pmatrix} 1 & 0 & 0 \\ 0 & \cos(w_X) & -\sin(w_X) \\ 0 & \sin(w_X) & \cos(w_X) \end{pmatrix} \quad (7)$$

$w_X$=tilt angle
$w_Y$=swivel angle–$q_i$

Figure 10:
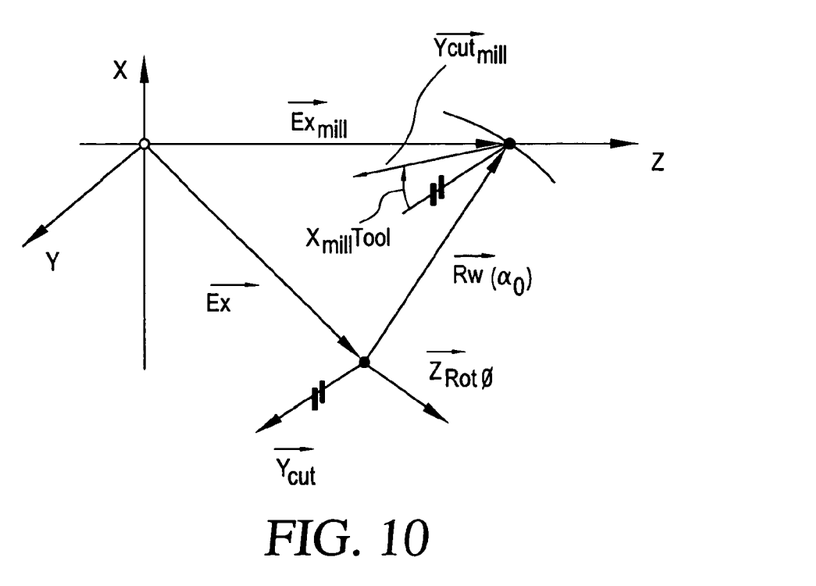
FIG. 10 shows the positions of tool axis vectors for a conventional face mill cutter and the tapered milling tool of the present invention.

The calculation of the milling tool axis vector $\vec{Y}_{Cut\ mill}$ from the traditional cutter axis vector $\vec{Y}_{Cut}$ shown in the following formulas as also shown in FIG. 10.

$$\vec{Y}_{Cut\ mill}(\alpha_i) = (T_{\phi y}) \times (T_{\phi x}) \times (\kappa_{mill\ tool}) \times (T_{\phi x})^T \times (T_{\phi y})^T \times \vec{Y}_{Cut} \quad (8)$$

where:

$$(T_{\phi y}) = \begin{pmatrix} \cos(\phi_y) & 0 & \sin(\phi_y) \\ 0 & 1 & 0 \\ -\sin(\phi_y) & 0 & \cos(\phi_y) \end{pmatrix} \quad (9)$$

$$(T_{\phi x}) = \begin{pmatrix} 1 & 0 & 0 \\ 0 & \cos(\phi_x) & -\sin(\phi_x) \\ 0 & \sin(\phi_x) & \cos(\phi_x) \end{pmatrix} \quad (10)$$

$$(\kappa_{mill\ tool}) = \begin{pmatrix} \cos(\kappa_{mill\ tool}) & -\sin(\kappa_{mill\ tool}) & 0 \\ \sin(\kappa_{mill\ tool}) & \cos(\kappa_{mill\ tool}) & 0 \\ 0 & 0 & 1 \end{pmatrix} \quad (11)$$

$$\phi_y = -\arctan\left(\frac{z_{Rot0,x}}{z_{Rot0,z}}\right) \quad (12)$$

$$\phi_x = \arctan\left(\frac{z_{Rot1,y}}{z_{Rot1,z}}\right) \quad (13)$$

$$\vec{Z}_{Rot\ 0} = \vec{R}_W(\alpha_i) \times \vec{Y}_{Cut} \quad (14)$$

$$\vec{Z}_{Rot\ 1} = (T_{\phi y}) \times \vec{Z}_{Rot\ 0} \quad (15)$$

$$\vec{R}_W(\alpha_i) = (T_{\delta z}) \times (T_{\delta x}) \times (\Delta \alpha) \times (T_{\delta x})^T \times R_W(\alpha_0) \quad (16)$$

where:

$$(T_{\delta z}) = \begin{pmatrix} \cos(\delta_z) & -\sin(\delta_z) & 0 \\ \sin(\delta_z) & \cos(\delta_x) & 0 \\ 0 & 0 & 1 \end{pmatrix} \quad (17)$$

$$(T_{\delta x}) = \begin{pmatrix} 1 & 0 & 0 \\ 0 & \cos(\delta_x) & -\sin(\delta_x) \\ 0 & \sin(\delta_x) & \cos(\delta_x) \end{pmatrix} \quad (18)$$

$$\delta_z = \arctan\left(\frac{Y_{Cut,x}}{Y_{Cut,y}}\right) \tag{19}$$

$$\delta_x = -\arctan\left(\frac{Y_{Cut1,z}}{Y_{Cut1,y}}\right) \tag{20}$$

$$\vec{Y}_{Cut1} = (T_{\delta z}) \times \vec{Y}_{Cut} \tag{21}$$

$\Delta\alpha$ = cutter phase angle difference from $\alpha_0$ $$\alpha_i = \alpha_0 = \Delta\alpha \tag{22}$$

$$\Delta\alpha = \frac{A_F}{N} \tag{23}$$

where: N=number of cutter angle increments $$(\Delta\alpha) = \begin{pmatrix} \cos(\Delta\alpha) & 0 & \sin(\Delta\alpha) \\ 0 & 1 & 0 \\ -\sin(\Delta\alpha) & 0 & \cos(\Delta\alpha) \end{pmatrix} \tag{24}$$

After performing the transformations from conventional basic setting to the settings of a tapered mill cutting tool the following steps can be applied in order to prepare all data for a 5 axis CNC machine:

Choose a number of roll position increments for the range $q_{start}$ to $q_{end}$ (e.g. 50 increments). That is: $q_1, q_2, q_3 \ldots q_{51}$ where: $q_1 = q_{start}$;
$q_2 = q_{start} + \Delta q$;
$q_3 = q_{start} + 2\Delta q$;
$q_{51} = q_{start} + 50\Delta q$
and $\Delta q => \Delta q = (q_{end} - q_{start})/50$ Apply for each roll position the formulas for the tool position (e.g. for 200 tool position increments). That is: $\alpha_1, \alpha_2, \alpha_3 \ldots \alpha_{201}$ where: $\alpha_1 = \alpha_0 - A_F/2$;
$\alpha_2 = \alpha_1 + \Delta\alpha$;
$\alpha_3 = \alpha_1 + 2\Delta\alpha$;
$\alpha_{201} = \alpha_1 + 200\Delta\alpha$
and $\Delta\alpha = A_F/200$ The described method was shown for the single indexing process. It can also be applied to the continuous indexing process. The cutter rotation $\omega$ is in a timed relationship to the work rotation, superimposed to the roll motion on the work (in a continuous mode) or applied in discrete roll positions, similar to the previous explanations, where either roll and cutter rotation angle (equal tapered mill position) have been observed in discrete increments (which is realistic regarding the function of a 5 or 6-axes machine):

$$\omega_{work} = \Omega_{Cradle}/R_a + \omega_{Cutter}(Z_{tool}/Z_{work}) \tag{25}$$

where: $\omega_{work}$=angular velocity of work
$\Omega_{Cradle}$=angular velocity of cradle
$R_a$=ratio of roll
$\omega_{Cutter}$=angular velocity of cutter
$Z_{tool}$=number of starts of tool
$Z_{work}$=number of teeth of work or $$\delta_{work,i,j} = \delta_{work,start} + q_i/R_A + \alpha_j(Z_{tool}/Z_{work}) \tag{26}$$

where: $\delta_{work,i,j}$=actual work rotational angle
$\delta_{work,start}$=work rotational angle at start position
$q_i$=cradle angle
$R_a$=ratio of roll
$\alpha_j$=cutter phase angle
$Z_{tool}$=number of starts of tool
$Z_{work}$=number of teeth of work However, the discrete observation and processing of the roll positions lead to a looped data and position processing, for example:

Roll position loop, q = $q_i$,     i = 1 to 51
|     Calculating current Ex and Ycut as function of $q_i$
|     Cutter phase angle loop, $\alpha = \alpha_j$,     j = 1 to 201
| |     Calculate current Rw and Ycut$_{mill}$ as function of $q_i$ and $\alpha_j$
| | 
|     Continue next phase angle increment
|
Continue next roll position In both cases, continuous or single index machining, the last presented formulas are valid and can be applied. Those formulas can be applied in case of an asymmetrical cutting channel 20 (FIG. 8) as well as for a symmetrical cutting channel 10 (FIG. 1). The symmetrical cutting channel 10 only presents a special case of the more general asymmetrical cutting channel ($\kappa_{mill\_tool} = 0$).

There are several possibilities to derive the formulas in order to position and move the tapered milling tool. However, trigonometric calculations would in their solution show intrinsic function depending on roll, tool rotation, and work rotation angles as well as linear constants. The derivations shown here use the basic machine settings, which relate to the generating gear. The resulting vectors $E_{x\,mill}$ and $Y_{cut\,mill}$ can be converted to basic settings:

$$S_i = \sqrt{(Ex_x)^2 + (Ex_z)^2} \tag{27}$$

$$q_i = \arctan(Ex_x/Ex_z) \tag{28}$$

$$X_{B,i} = Ex_y \tag{29}$$

$$Wx_{,i} = \arccos(Ycut_{mill,y}) \tag{30}$$

$$Wy_{,i} = \arctan(Ycut_{mill,x}/Ycut_{mill,z}) - q_i \tag{31}$$

Additional basic settings, such as:
$X_P$ (head setting)
$E_M$ (offset)
$\gamma_M$ (root angle)
$R_a$ (ratio of roll)
do not change during the conversion from conventional tool to tapered mill.

The basic settings, as shown above can be converted into a 5-axes machine coordinate system, using the formulas disclosed in U.S. Pat. No. 4,981,402, the disclosure of which is hereby incorporated by reference.

Figure 11:
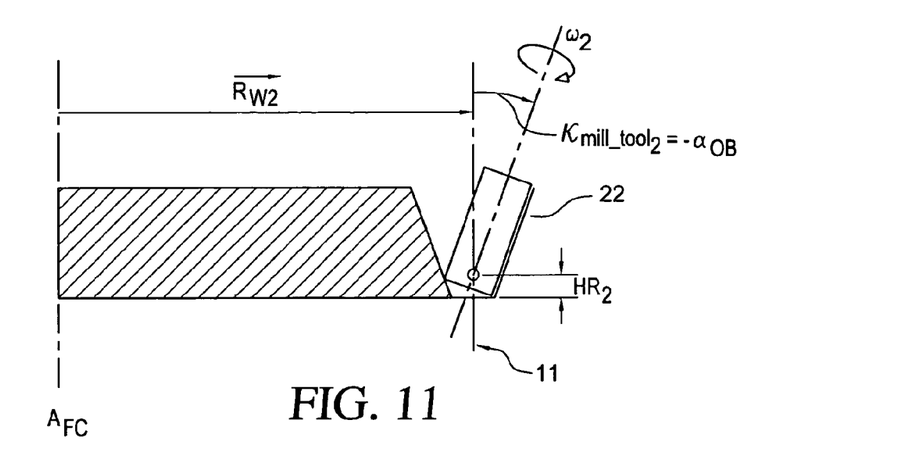
FIG. 11 illustrates a cylindrical-shaped milling tool for cutting a tooth flank surface in accordance with the inventive method.

The inventive machining method also contemplates cutting with non-tapered milling tools (e.g. cylindrical tools) and machining only one flank surface (e.g. the outside flank) as shown in FIG. 11. The tool inclination angle in this case is $-\alpha_{OB}$. The maximal diameter of such a tool is limited as shown in FIG. 11. A diameter larger than shown in FIG. 11 causes mutilation of the opposite flank (inside flank). It is possible with such a cylindrical tool to machine the opposite flank in a second set of machining passes, if the sign of the tool inclination angle is changed (+$\alpha_{OB}$). For correct definition it should be stated, that the vector $R_{W2}$ points to the centerline of the reference profile. Its preferred location is in the center of the tooth, in case of asymmetric pressure angles it is located radial in order to split the point width of the reference profile in two equal parts. The point width is the width of the bottom of the reference channel, in an axial plane in case of face milling cutters, in the offset plane in case of face hobbing cutters. The milling tool can be located using different references which has no effect on the functionality of the inventive method.

Figure 12:
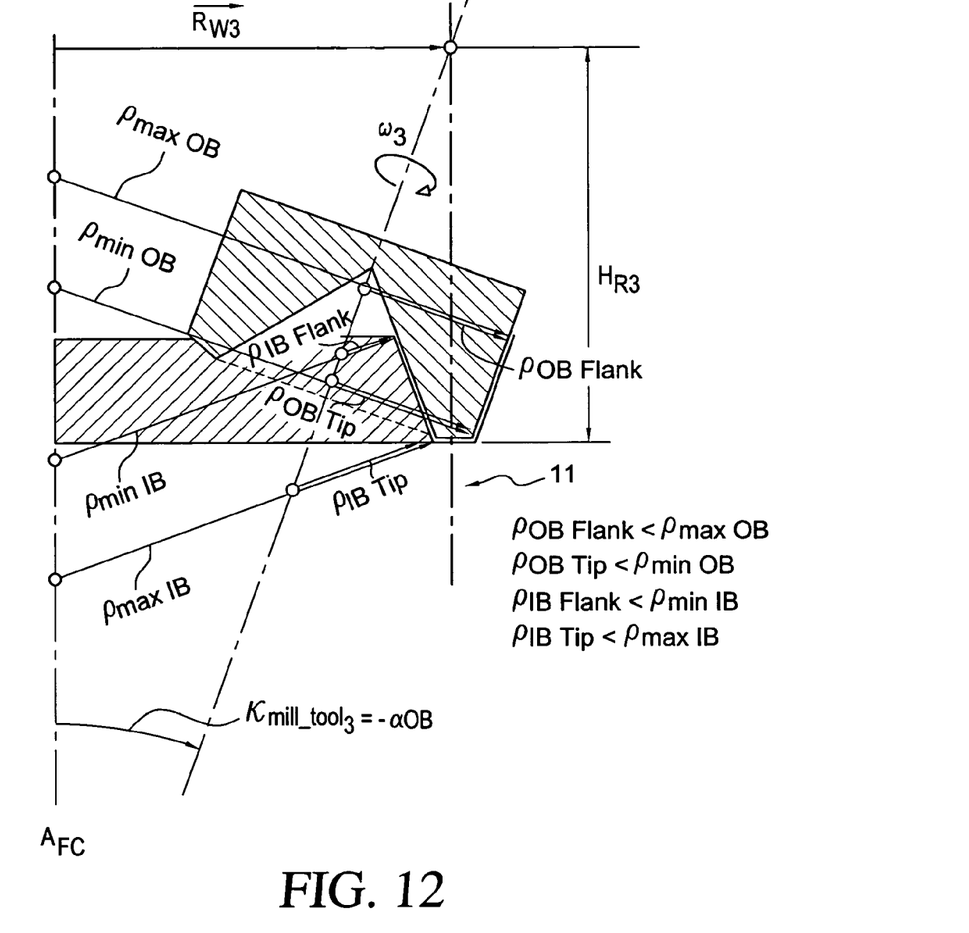
FIG. 12 illustrates the effect of tool diameter and tool radius of curvature with regard to tooth flank mutilation.

If the tool diameter is increased to a certain extent it becomes possible to machine the second flank (IB) simultaneously to the first (OB-flank—see FIG. 12). However, in order to machine a flank without mutilation, the requirement regarding the curvature radius is as follows:

$\rho_{OB\ Tip} \leq \rho_{minOB}$ (given in FIG. 12)

$\rho_{OB\ Flank} \leq \rho_{maxOB}$ (given in FIG. 12)

$\rho_{IB\ Tip} \geq \rho_{maxIB}$ (not given in FIG. 12)

$\rho_{IB\ Flank} \geq \rho_{minIB}$ (not given in FIG. 12)

Figure 13:
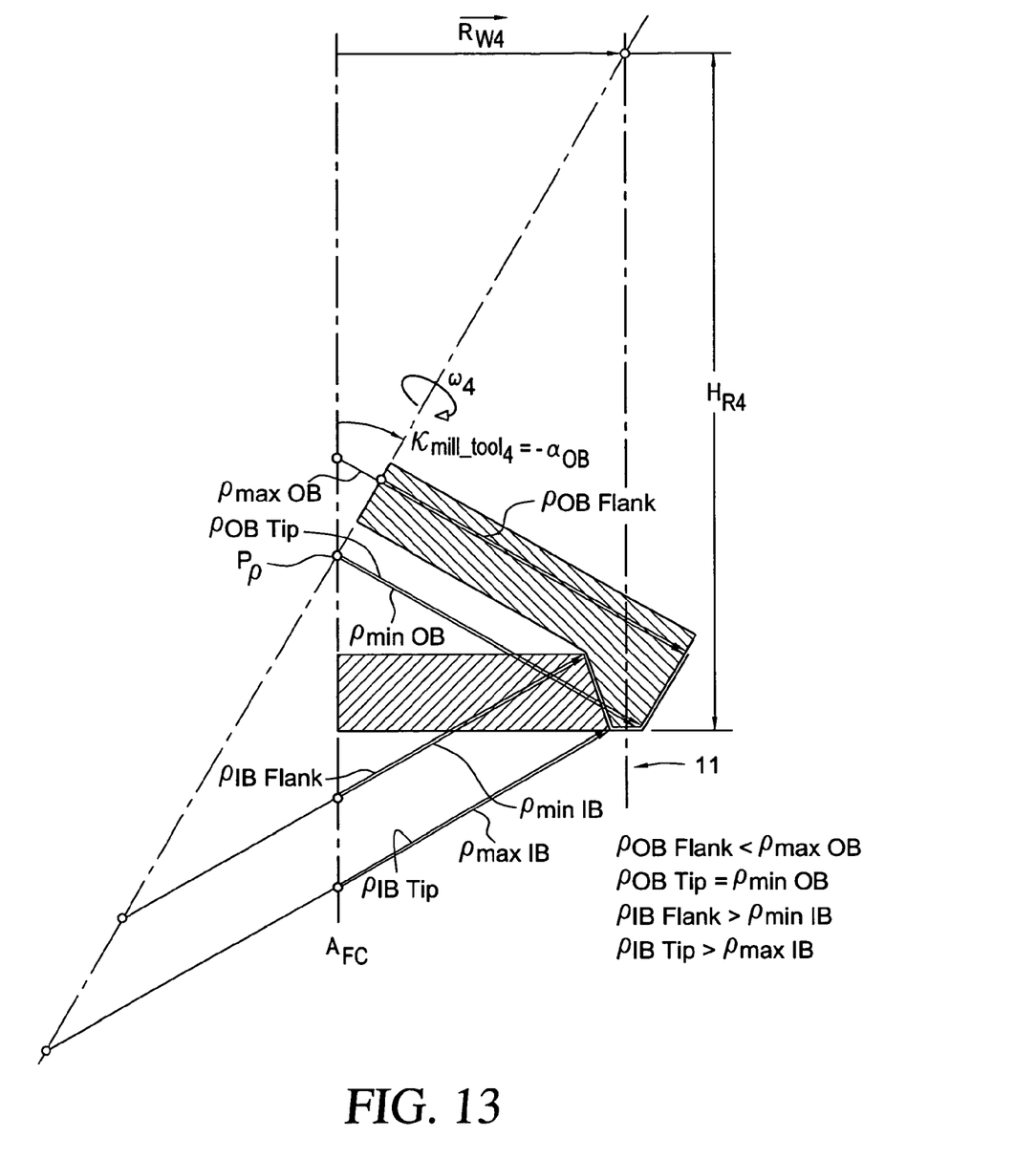
FIG. 13 shows an increased tool diameter with respect to FIG. 12 such that tooth flank mutilation is avoided.

The diameter of the cutting tool has to be increased, until the axis of rotation crosses the origin of $\rho_{minOB}$ (intersection with original cutting tool axis, $A_{FC}$). In such a case, $\rho_{IB\ Tip} = \rho_{maxIB}$ and $\rho_{IB\ Flank} > \rho_{minIB}$ applies (FIG. 13). $\kappa_{mill\_tool}$ in FIG. 13 is still $-\alpha_{OB}$ as in FIG. 11.

Figure 14:
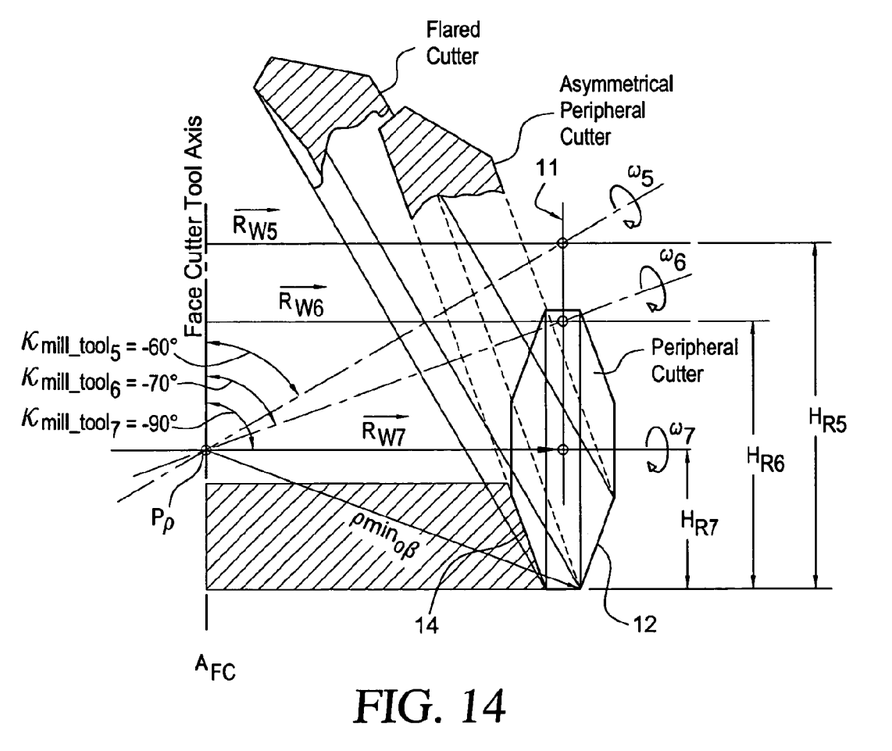
FIG. 14 illustrates various milling tool inclination angles

Different angles of $\kappa_{mill\_tool}$ can be realized, if the axis of rotation intersects with the original tool axis in point $P_\rho$. $P_\rho$ is determined as the origin of $\rho_{minOB}$. $\rho_{IB} > \rho_{maxIB}$ is always given in such a case. FIG. 14 shows machining tool geometries based on $\kappa_{mill\_tool} = -60°, -70°$ and $-90°$. It is noted that $\kappa_{mill\_tool} = -90°$ defines a peripheral tool. In every case in FIG. 14 (cases 5, 6, and 7) the vector $\rho_{minOB}$ was constructed first. It has an intersection with the face cutter tool axis, $A_{FC}$, at point $P_\rho$. The chosen milling tool inclination angle $\kappa_{mill\_tool}$ leads in FIG. 14 to a tool axis which crosses the face cutter tool axis at point P$\rho$. This leads to the smallest possible milling tool diameter which fulfills the requirements:

$\rho_{OB\ Tip} \leq \rho_{minOB}$ (in FIG. 14 $\rho_{OB\ Tip} = \rho_{minOB}$)

$\rho_{OB\ Flank} \leq \rho_{maxOB}$ (given in FIG. 14)

$\rho_{IB\ Tip} \geq \rho_{maxIB}$ (given in FIG. 14)

$\rho_{IB\ Flank} \geq \rho_{minIB}$ (given in FIG. 14)

While the invention has been described with reference to preferred embodiments it is to be understood that the invention is not limited to the particulars thereof. The present invention is intended to include modifications which would be apparent to those skilled in the art to which the subject matter pertains.

What is claimed is:

1. A method of producing a bevel gear with a tool to be brought into engagement with a workpiece and being rotatable about a tool axis of a metal removing machine having a plurality of machine axes, said metal removing machine being a CNC free-form bevel gear machine or a CNC milling machine comprising five axes, said method comprising:
   defining a face mill cutter center position of a conventional cutting machine setup;
   repositioning the tool from said face mill cutter center position to an offset tool position such that the tool axis is coincident with, or orientated at an angle to, a reference profile center line of a tooth slot to be produced;
   rotating said tool and bringing said tool into engagement with a workpiece;
   providing relative movement between said tool and said workpiece to traverse said tool along the face width of said workpiece in a plurality of passes to progressively form a tooth slot wherein said tool follows a circular arc in each of said passes.

2. The method of claim 1 wherein said tool is a tapered milling tool.

3. The method of claim 2 wherein said angle is zero degrees.

4. The method of claim 1 wherein prior to each of said passes, the tool and workpiece are positioned relative to one another in a different generating roll position.

5. The method of claim 1 wherein said plurality of passes are carried out simultaneously with a continuous generating roll motion defined by continuous relative positioning of said tool and workpiece.

6. The method of claim 1 further comprising:
   rotating said workpiece in a timed relationship with the speed of the traversal of the tool along the face width of the workpiece.

7. The method of claim 1 wherein said tool is a cylindrical shaped tool.

8. The method of claim 1 wherein said tool is a peripheral tool.

9. The method of claim 1 wherein said tool is a cutting tool.

10. The method of claim 1 wherein said tool is a grinding tool.

11. The method of claim 1 wherein said angle is the range of 0 degrees to −90 degrees.

12. The method of claim 1 wherein the offset tool position is located at the center of the tooth face width of the workpiece.

13. The method of claim 1 wherein each of said passes comprises traversal of the tool along the face width of the workpiece in a forth and back direction.

14. The method of claim 1 wherein the formed tooth slot is identical with a tooth slot formed by a face mill cutter positioned at said face mill cutter center position of a conventional cutting machine setup.

* * * * *